United States Patent [19]

Mitchell et al.

[11] Patent Number: 4,849,883
[45] Date of Patent: Jul. 18, 1989

[54] PROFESSIONAL OFFICE SYSTEM PRINTER SUPPORT FOR PERSONAL COMPUTERS

[75] Inventors: Michael O. Mitchell, Dallas County; Kevin P. McGlynn, Denton County, both of Tex.

[73] Assignee: International Business Machines Corp., Armonk, N.Y.

[21] Appl. No.: 115,019

[22] Filed: Oct. 28, 1987

[51] Int. Cl.⁴ .............................................. G06F 1/00
[52] U.S. Cl. .................................................. 364/300
[58] Field of Search ........................ 364/200, 300, 900

[56] References Cited

U.S. PATENT DOCUMENTS 4,760,406 7/1988 Sato et al. ....................... 364/900 X Primary Examiner—Raulfe B. Zache
Attorney, Agent, or Firm—Whitham & Marhoefer

[57] ABSTRACT

A printer support utility provides full support for all compatible printers attached to personal computers operating in a professional office system environment. The utility provides an interface that interprets ANSI printable data and restructures the data to allow for improved printing of underscore, overstrike and highlight, especially in non-impact printers such as laser printers and ink jet printers. The utility reads each line of printable data from an input file and tests the line for a line control indicating a new print line. If not a new print line, the utility scans the line for underscoring, overstriking and highlighting of characters; but if a new print line, the utility converts the scanned line to a personal computer printer line and writes the line to an output file. Finally, the converted print line in the output file is printed.

4 Claims, 4 Drawing Sheets

PROFESSIONAL OFFICE SYSTEM PRINTER SUPPORT FOR PERSONAL COMPUTERS

BACKGROUND OF THE INVENTION

1. Field of the Invention

The present invention generally relates to the control of printers attached to personal computers and, more particularly, to a technique for supporting all personal computer compatible printers in the environment of a professional office system. Specifically, the invention provides support for non-impact printers, such as laser printers and ink jet printers and other printers which do not respond to ANSI printable data for providing underscore, highlighting and overstriking.

2. Description of the Prior Art

The IBM Professional Office System (PROFS) is a licensed program designed to provide a comprehensive and easy-to-use set of office system and principal-support functions for business professionals. PROFS is a trademark of the IBM Corp The PROFS program is designed to operate in the Virtual Machine (VM) environment on IBM S-370 main frame computers. In particular, PROFS systems on multiple IBM 9370 computers have gained wide acceptance in departmental applications. For more information on the PROFS system, the reader is referred to "Using the Professional Office System, Version 2, Release 2", IBM Publication No. SH20-6797-01, Second Edition (June 1986).

The PROFS Personal Computer Support feature extends many of the powerful functions of PROFS to the IBM Personal Computer family. Used in conjunction with PROFS Version 2 at the host, this feature provides the intelligent workstation user with many PROFS functions using only the Personal Computer. For most users, a host PROFS session would be initiated only to transfer PROFS mail or other files or to use PROFS or VM functions that are not available at the Personal Computer.

Using this feature, the Personal Computer user sees a set of menus similar and complementary to those on the host PROFS system. The PROFS functions supported by this feature include in-basket processing of both notes and documents and viewing and processing of mail. PROFS Personal Computer Support also permits the user to store and mail Personal Computer files and to store groups of files on the host PROFS data base. These files can be DisplayWrite (TM of IBM Corp.) documents, spreadsheets, or other application reports. Documents created on DisplayWrite 1, 2 or 3 can be exchanged with PROFS users and PROFS Personal Computer Support users. For more information on the PROFS Personal Computer Support, the reader is referred to "Getting Started with the Professional Office System, Version 2 PC Support", IBM Publication No. SH20-6805-0, First Edition (February 1986).

The PROFS Personal Computer Support supports printers attached to Personal Computers by transferring ANSI files to the Personal Computer which are printed with a routine that understands the ANSI print controls. The problem is that ANSI controlled printing does not and can not allow non-impact printers (e.g., laser printers, ink jet printers and the like) to print bold characters. In addition, underlining is broken between characters and is difficult to see.

To better understand the problem, consider the following example:

This is a tast test.

This is but one line of text, but the ANSI printable data stream is in reality four lines, the first three ending with carriage returns but no indexing and the last ending with a carriage return with an index. The first line is the text itself; that is, "This is a tast test." The next line is the underscore for "is", followed by the third line with the overstrike for "tast", and finally the fourth line for the bold or highlight for "test". An impact printer can be easily controlled to perform several passes of the same line according to the ANSI standard. And, in fact, the PROFS Personal Computer Support includes a utility that accomplishes this result.

The problem is that non-impact printers such as laser and ink jet printers can not make multiple passes on the same line. The underscore, overstrike or highlight must be incorporated into the text as the text is formed. The problem then is to provide support for these printers which, while compatible with the personal computer and generally supported by most popular software run on the Personal Computer, are not currently supported by the PROFS Personal Computer Support feature.

SUMMARY OF THE INVENTION

It is therefore an object of this invention to provide full support for all compatible printers attached to personal computers operating in a professional office system environment.

It is a further object of the invention to provide a software interface which interprets ANSI printable data and restructures the data to allow for bold face output on non-impact printers, provide for improved bold faced and underline output on impact printers, and provide for improved underline output on non-impact printers.

According to the invention, as the original file is being read, the process scans as many lines ahead as needed to determine if special characters need to be added to any of the prior lines. If so, the process then writes the special characters with the prior lines and discards any unneeded information before writing the new lines.

Thus, the subject invention reads the PROFS files to be printed, interprets the intent of the user, and communicates this to all Personal Printers compatible computers. Printing boldfaced characters is now possible, and the boldfaced characters are much clearer and standout better than the prior method. Further, underlining and boldfaced printing is consistent with other Personal Computer applications that print boldfaced characters and underline, and DOS (Disk Operating System) background printing can be used to allow the user to continue working on the Personal Computer while the printing is being done in the background.

BRIEF DESCRIPTION OF THE DRAWINGS

The foregoing and other objects, aspects and advantages of the invention will be better understood from the following detailed description of a preferred embodiment of the invention with reference to the drawings, in which.

DETAILED DESCRIPTION OF THE PREFERRED EMBODIMENT OF THE INVENTION

Figure 1:
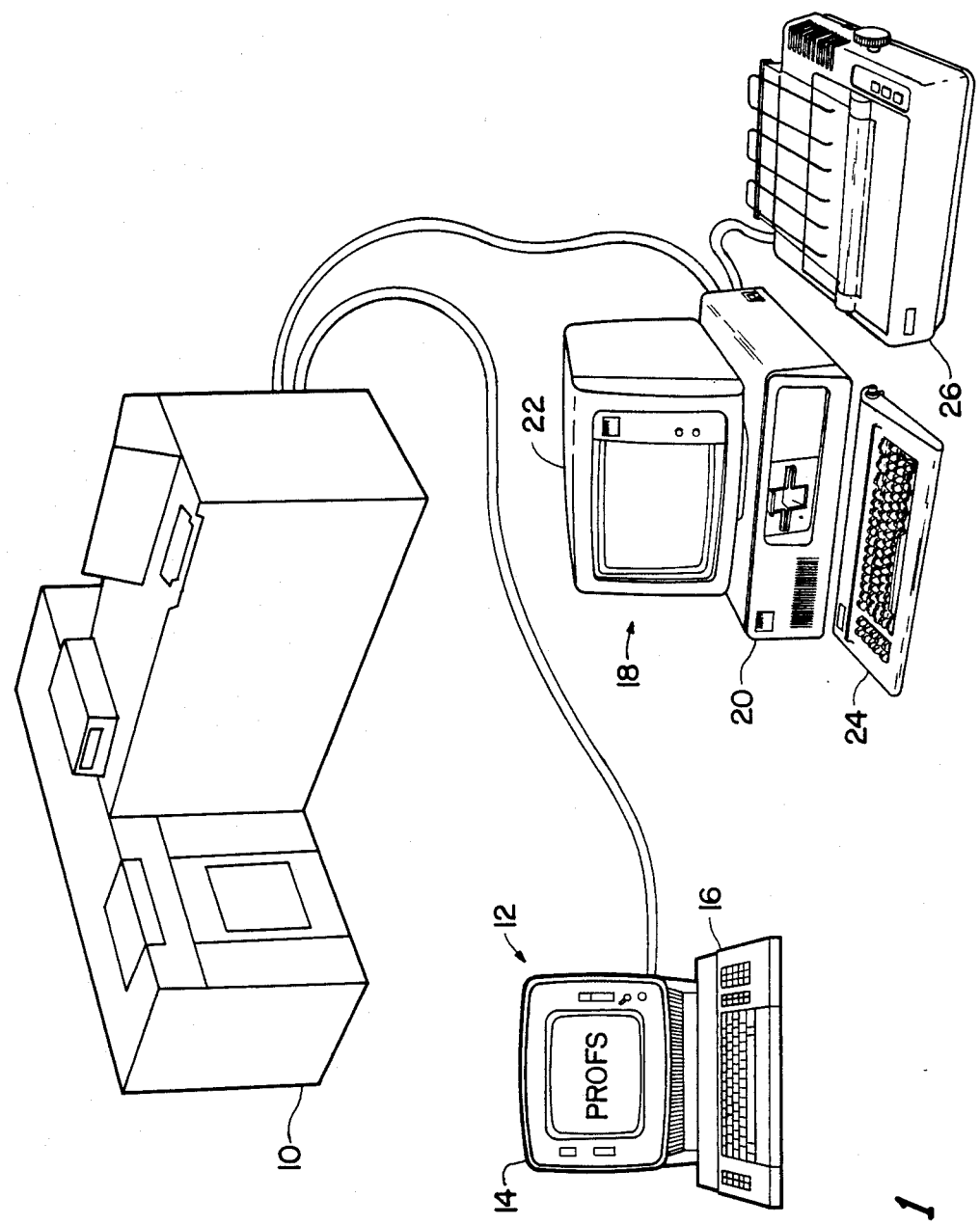
FIG. 1 is a pictorial diagram illustrating a mainframe computer to which a terminal and a personal computer are attached and wherein the printer support according to the invention is run on the personal computer.

Referring now to the drawings, and more particularly to FIG. 1, there is shown a host mainframe computer 10 having attached thereto a terminal 12. As mentioned, the mainframe computer may be, for example, an IBM 9370 computer. The terminal 12 may be, for example, an IBM 3270 series terminal having a display 14 and a keyboard 16. In a typical system running the PROFS system, there would be several terminals connected to the host computer and, in some applications, a plurality of host computers would be linked together in a network. However, for purposes of this disclosure, only one host computer with but a single terminal is shown.

In addition to the terminal 12, a Personal Computer 18, such as the IBM PC, is attached to the host computer 10. The PC 18 typically comprises a system unit 20, a display 22 and a keyboard 24. In addition, the PC 18 may have attached to it a PC printer 26, such as the IBM matrix printer or other PC compatible printer. In order for the PC 18 to communicate with the terminal 12 or other PCs attached to the system, PROFS PC Support must be installed on both the mainframe computer 10 and the PC 18. Under PROFS PC Support, the printer 26 is optional, but the purpose of the subject invention is to provide a software interface which interprets the printable data on PC 18 before going to the printer 26 and restructures that print data stream. By restructuring, we mean that the software interface does more than just insert control characters. More specifically, the restructured print data stream (1) allows for bold face output on non-impact printers, (2) provides for improved bold face and underline output on impact printers, and (3) provides for improved underline output on non-impact printers.

Figure 2:
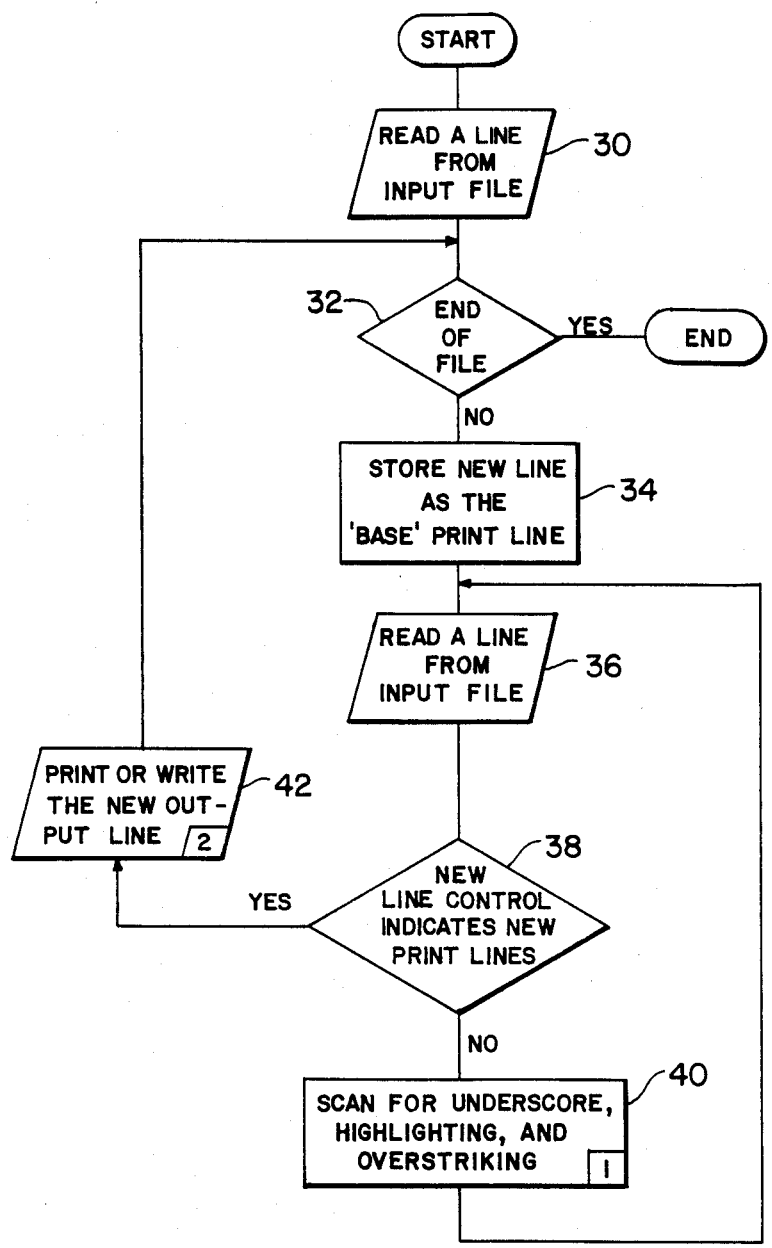
FIG. 2 is a flow diagram showing the logic of the main program of the printer support according to the invention.

Turning now to FIG. 2, the main program starts when an output is directed to a printer under the PC Disk Operating System (DOS). The first operation in block 30 is to read a line from the input file. A test is made in block 32 to determine if the line read is the end of the file. If it is, the procedure ends, but if not, the next operation is to store the new line as the "base" print line, as indicated in block 34. Then, in block 36, a new line is read from the input file. A test is made in block 38 to determine if the new line control indicates a new print line (e.g., is not an overstrike line). If not, the line is scanned for underline, highlighting and overstrike in block 40 before control returns to block 36. The functions performed in block 40 are performed by a routine shown in FIG. 3 and called by the main program. Returning to block 38, if the test is positive, that is the new line control indicates a new print line, a new output line is printed or written in block 42 before control returns to block 32. The functions performed in block 42 are performed by a routine shown in FIG. 4 and called by the main program.

Figure 3:
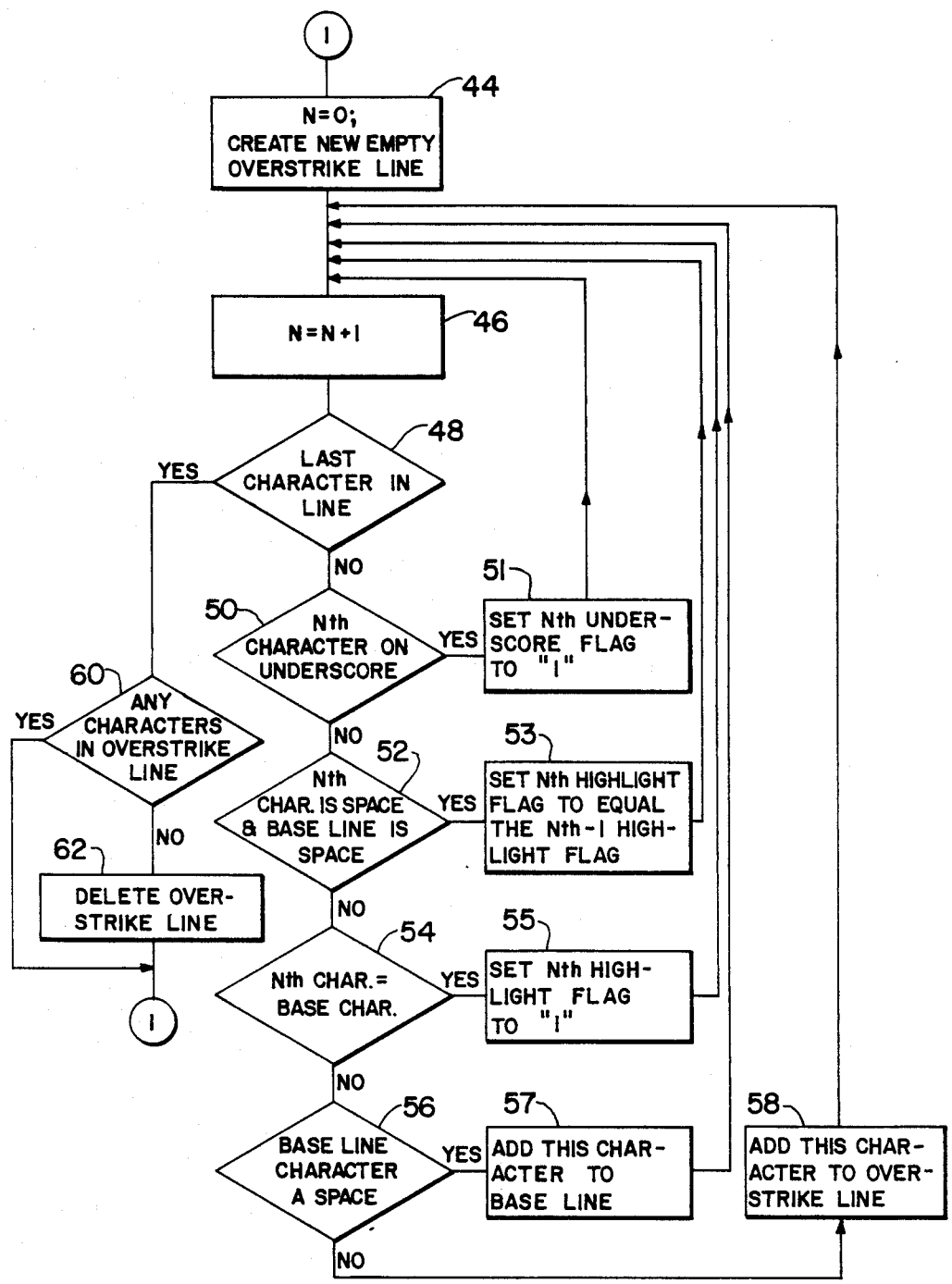
FIG. 3 is a flow diagram showing the logic of the scanning routine called from the main program shown in FIG. 2.

The call made in block 40 calls the routine shown in FIG. 3, to which reference is now made. This routine begins by initializing N to zero and creating a new empty overstrike line, as indicated in block 44. Next N is incremented in block 46. A test is made in block 48 to determine if the character being processed is the last character in the line. If not, a test is made in block 50 to determine if the Nth character is an underline. If so, the Nth underscore flag is set in block 51 and control returns to block 46; otherwise, a test is made in block 52 to determine if the Nth character is a space and the base line is a space. If so, the Nth highlight flag is set equal to the N−1 highlight flag in block 53 and control returns to block 46; otherwise, a test is made in block 54 to determine if the Nth character is equal to the Nth baseline character. If so, the Nth highlight flag is set in block 55 and control returns to block 46; otherwise, a test is made in block 56 to determine if the base line character is a space. If so, the character is added to the base line as the Nth base line character in block 57 and control is returned to block 46; otherwise, the character is added to the overstrike line in block 58 before control is returned to block 46.

This processing continues until there is a positive result from the test in block 48; i.e., the last character in the line has been processed. When this occurs, a test is made in block 60 to determine if there are any characters in the overstrike line. If not, the overstrike line is deleted in block 62 before a return is made to the main program; otherwise, a return is made to the main program directly from block 60.

Figure 4:
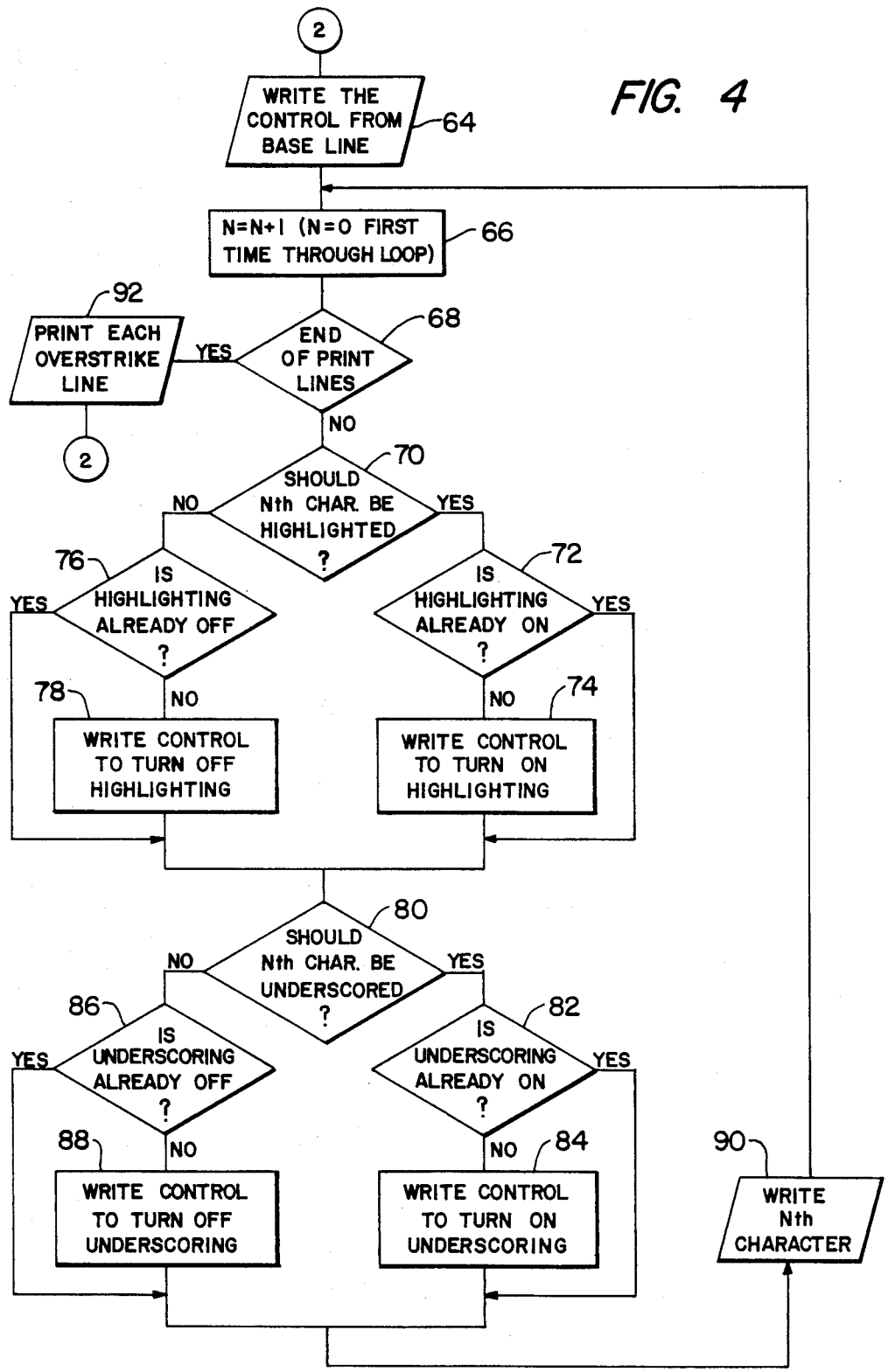
FIG. 4 is a flow diagram showing the logic of the print subroutine called from the main program shown in FIG. 2.

The routine called from block 42 in FIG. 1 is shown in FIG. 4, to which reference is now made. When this routine is called, the first procedure is to convert the ANSI control from the base line to PC print control and write the converted control, as indicated in block 64. Then N is incremented in block 66 before a test is made in block 68 to determine if all of the base print lines have been processed. Assuming that all the lines have not been processed, a test is made in block 70 to determine if the Nth character should be highlighted (Nth highlight flag=1). If so, a test is made in block 72 to determine if the highlighting is already turned on. If not, the control is written to turn on the highlighting in block 74. On the other hand, if the Nth character is not to be highlighted, a test is made in block 76 to determine if the highlighting is already off. If not, the control is written to turn off the highlighting in block 78.

At this point, a test is made in block 80 to determine if the Nth character is to be underlined. If so, a test is made in block 82 to determine if the underlining is already on. If not, the control is written to turn the underlining on in block 84. On the other hand, if the Nth character is not to be underlined, a test is made in block 86 to determine if the underlining is already off. If not, the control is written to turn off the underlining in block 88.

At the conclusion of this processing, the Nth character is written in block 90, and control of the program returns to block 66. This processing continues until the end of the base print line is detected in block 68, at which time each overstrike line is printed in block 92 before a return is made to the main program.

While the invention has been described in terms of a single preferred embodiment, those skilled in the art will recognize that the invention can be practiced with modification and alteration within the spirit and scope of the appended claims.

Having thus described our invention, what we claim as novel and desire to secure by Letters Patent is as follows:

1. A printer support utility for supporting all compatible printers attached to personal computers which provides an interface that interprets ANSI printable data and restructures the data to allow for improved printing of underscore, overstrike and highlighting, comprising the computer performed steps of:

reading each line of printable data from an input file;

testing a line read from said input file for a line control indicating a new print line;

if not a new print line, scanning the line for underscoring, overstriking and highlighting of characters;

if a new print line, converting the scanned line to a personal computer printer line and writing the line to an output file; and printing a converted print line in the output file.

2. The printer support utility as recited in claim 1 wherein said step of scanning the line comprises the computer performed steps of:

creating a new empty overstrike line for each line read from said input file and adding any character in the overstrike line which is an overstrike;

testing for a last character in the line and when the last character is detected in the line, testing for any characters in said overstrike line;

if there are no characters in said overstrike line, deleting said overstrike line; and for each character having an underscore and/or highlight, setting a corresponding flag.

3. The printer support utility as recited in claim 2 wherein said step of converting the scanned line comprises the computer performed steps of:

testing for an underscore or highlight flag being set for each character in the line and turning underscore and/or highlight on or off for each character according to whether the corresponding flag has been set; and writing each overstrike character to an overstrike line.

4. The printer support utility as recited in claim 3 wherein said step of printing the converted line in the output file includes the step of printing said overstrike line if said overstrike line has not been deleted.

* * * * *